Feb. 3, 1931.   W. A. CHRYST   1,791,192
SHOCK ABSORBER
Filed Sept. 26, 1928
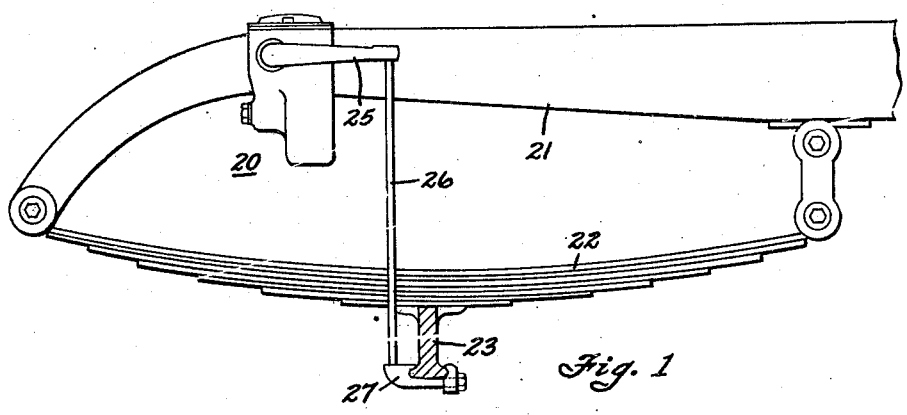
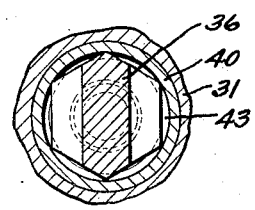
Fig. 3
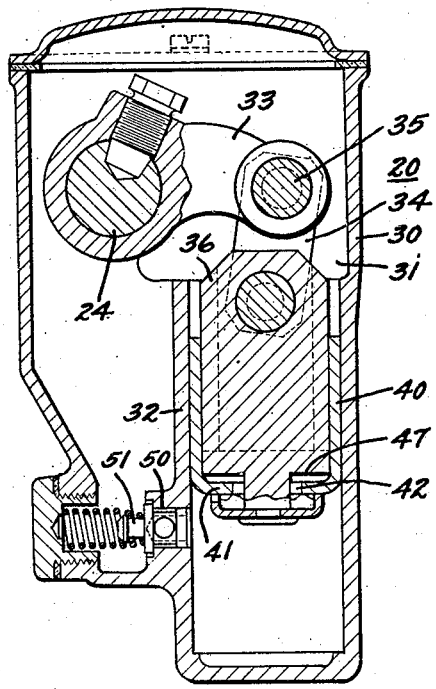
Fig. 2
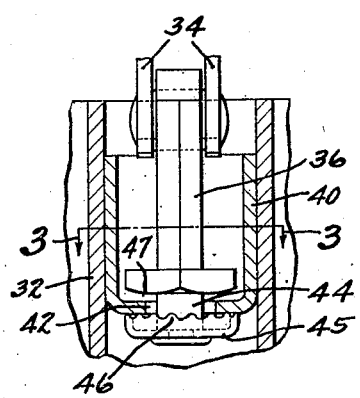
Fig. 4
Inventor
William A. Chryst
By Spencer Hardman & Fehr
His Attorneys Patented Feb. 3, 1931

1,791,192

UNITED STATES PATENT OFFICE

WILLIAM A. CHRYST, OF DAYTON, OHIO, ASSIGNOR, BY MESNE ASSIGNMENTS, TO DELCO PRODUCTS CORPORATION, OF DAYTON, OHIO, A CORPORATION OF DELAWARE

SHOCK ABSORBER

Application filed September 26, 1928. Serial No. 308,477.

This invention relates to improvements in shock absorbers particularly adaptable for use on vehicles.

It is among the objects of the present invention to provide a shock absorber in which certain of the control valves are of simple design and construction, which will function positively, substantially under all conditions.

Another object of the present invention is to eliminate the use of springs in certain of the control valves of the shock absorber, making their operation positive and providing for a free-centering operation of the device.

Further objects and advantages of the present invention will be apparent from the following description, reference being had to the accompanying drawings, wherein a preferred embodiment of one form of the present invention is clearly shown.

In the drawings:

Fig. 1 illustrates the shock absorber attached to the front end of a vehicle frame.

Fig. 2 is a vertical sectional view of the shock absorber, showing the piston member adjacent its lowest position.

Fig. 3 is a fragmentary sectional view taken along the line 3—3 of Fig. 4.

Fig. 4 is a fragmentary sectional view showing the piston and its operating connection.

Referring to the drawings, the numeral 20 designates the shock absorber as a whole which, as shown in Fig. 1, is adapted to be attached to the side of the vehicle frame 21. Springs 22, only one of which is shown, support the frame 21 upon the axle 23. The shock absorber 20 has an operating shaft 24 journalled therein, said shaft having an outer arm 25, the free end of which is connected to the axle 23 by the connecting rod 26 and the bracket 27.

The shock absorber 20 comprises a casing 30, presenting a fluid chamber 31 and a cylinder 32. The shaft 24, journalled in the casing 30, has a rocker arm 33 attached thereto within said casing, the free end of said rocker arm having links 34 pivotally secured to it by a pin 35. The other ends of said links are pivotally attached to the polygonal member 36.

A piston 40 is reciprocably mounted in the cylinder 32 and has a head portion 41 provided with a central port or opening 42. Member 36 is preferably polygonal, the corners forming guides which fit into the piston 40. Spaces 43 are provided between the facets of the member and the cylindrical wall of the piston, providing fluid passages. Member 36 has a cylindrical lug portion 44 extending from it, through the port or opening 42, said portion 44 has an inverted cup-shaped member 45 attached to it, outside the piston head portion 41. The annular edge of the cup-shaped member 45 has serrations 46, presenting a plurality of fluid passages. The shoulder 47 provided by the member 36 between its polygonal and cylindrical portions is spaced from the serrated edge of the cup-shaped member 45 so that a limited free action of the arm 33 obtains in one direction before the shoulder will engage the inner surface of the piston head to close the port or opening 42 and move the piston on its compression stroke, and in the other direction, before the serrated edge of the cup-shaped member 45 engages the outer surface of the piston head to move said piston on its suction stroke. The serrations in the edge of member 45 provide passages which establish a substantially free flow of fluid from the fluid chamber 31 into the cylinder 32 on the suction stroke of the piston.

A port 50 in the wall of the cylinder, beneath the piston, is provided with a spring loaded relief valve 51 which may move from its position in which it normally closes said port 50, when the pressure within the cylinder exceeds a predetermined value, whereby the port is opened to relieve said excessive pressure. The link connection 26 is so arranged that rebounding movements of springs 22 will at no time move the arm 25 to operate the piston so that it will be moved over and close the port 50. In the Fig. 2 the piston is shown adjacent its lowest possible position.

From the aforegoing it will be seen that the present invention provides a shock absorber having a free centering feature, the structure of which presents a positively actuated intake valve of simple construction, permitting easy assembling and which is not dependent upon a spring for closing or opening it at the proper time.

While the form of embodiment of the present invention as herein disclosed, constitutes a preferred form, it is to be understood that other forms might be adopted, all coming within the scope of the claims which follow.

What is claimed is as follows:

1. A shock absorber comprising in combination, a casing presenting a fluid reservoir and a cylinder, a piston in said cylinder; an oscillatable lever within said casing; a port in the piston providing for the transfer of fluid from one side of the piston to the other, in response to the movement of the piston in one direction; and means providing a lost motion connection between the oscillatable lever and the piston and providing a means controlling the flow of fluid through the piston port, said means having a polygonal portion slidably fitting within the piston, thereby substantially preventing rattling and noisy operation and establishing fluid passages between the connecting means and piston wall.

2. A shock absorber comprising in combination, a casing presenting a fluid reservoir and a cylinder, a piston in said cylinder; an oscillatable lever within said casing; a port in the piston providing for the transfer of fluid from one side of the piston to the other, in response to the movement of the piston in one direction; and means providing a lost motion connection between the oscillatable lever and the piston, said means having provisions for closing the piston port when said piston is being moved in the one direction and for establishing a free flow of fluid through said port when the piston is being moved in the other direction, the port closing means comprising a polygonal portion slidably fitting within the piston and having a lug portion extending through the piston port, said lug portion having a cup member attached thereto so as to be in spaced relation with the polygonal portion, the cup member being adapted to engage the outside wall of the piston without closing the piston port.

3. A shock absorber, comprising in combination, a casing presenting a fluid reservoir and a cylinder; a piston in the cylinder; an oscillatable lever within said casing; a port in the cylinder, providing for the transfer of fluid from one side of the piston to the other in response to the movement of the piston in one direction; and means providing a lost motion connection between the piston and oscillatable lever, said means comprising a link member having a polygonal portion, the points of which slidably engage the inner wall of the piston, the flat sides of said member providing fluid passages between said member and piston wall, the bottom end of said member, which is adapted to engage with the inner wall of the piston head and close the port therein, having a central lug extending through said port and supporting a disc in spaced relation to the polygonal portion, said disc having a serrated edge adapted to engage the piston and move it in said one direction in response to movement of the oscillatable lever, the serrated edge providing for the free flow of fluid through said piston port during the movement of the piston by said disc.

4. A shock absorber comprising, in combination, a casing presenting a fluid chamber and a cylinder, a piston in said cylinder, said piston having a central annular port in its head portion; a rocker arm in the casing, and means connecting the piston to the rocker arm, said means including a polygonal member having a cylindrical part extending through the port, said member presenting a shoulder adapted to engage with the inner wall of the piston head to move it on its compression stroke and simultaneously to close the port while the piston is so being moved, and a cup-shaped member secured to the cylindrical part of said member on the outside of the piston, having a serrated edge adapted to engage the outer wall of the piston to move it on its suction stroke, the serrations providing fluid passages whereby fluid may flow freely through the piston port during the suction stroke of said piston.

5. A shock absorber comprising, in combination, a casing presenting a fluid reservoir and a cylinder; a fluid displacement member reciprocatively supported within said cylinder, said member having a port providing for the transfer of fluid from one side of the member to the other; an oscillatable lever within said casing; linkage connecting the lever with said member, said linkage having spaced flanges with an intermediate shank portion, the shank portion extending through the port in the member and a flange on each side of said port; one of said flanges having a serrated edge adapted to engage the member.

6. A shock absorber comprising, in combination, a casing presenting a fluid reservoir and a cylinder, a piston in said cylinder; an oscillatable lever within said casing; a port in the piston providing for the transfer of fluid from one side of the piston to the other, in response to the movement of the piston in one direction; and a lost motion connection between the lever and piston, said connection providing a member adapted to engage the piston to move it in the one direction and to close the port in said piston, and a second member having a serrated edge adapted to engage the piston and move it in the other direction while permitting fluid to flow through the piston port.

In testimony whereof I hereto affix my signature.

WILLIAM A. CHRYST.